United States Patent
Ogata

(10) Patent No.: US 9,563,106 B2
(45) Date of Patent: *Feb. 7, 2017

(54) TELECONVERTER MOUNTED ON A MASTER LENS APPARATUS TO OBTAIN A LENS SYSTEM HAVING A FOCAL LENGTH LONGER THAN THAT OF THE MASTER LENS APPARATUS, AND IMAGING SYSTEM COMPRISING THE SAME

(71) Applicant: OLYMPUS CORPORATION, Tokyo (JP)

(72) Inventor: Yasuji Ogata, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/673,194

(22) Filed: Mar. 30, 2015

(65) Prior Publication Data
US 2015/0205188 A1    Jul. 23, 2015

Related U.S. Application Data

(62) Division of application No. 13/892,253, filed on May 11, 2013, now Pat. No. 9,075,291.

(30) Foreign Application Priority Data

May 11, 2012   (JP) ................................. 2012-109239

(51) Int. Cl.
*H04N 5/225* (2006.01)
*H04N 5/262* (2006.01)
(Continued)

(52) U.S. Cl.
CPC ............. *G03B 17/565* (2013.01); *G02B 13/02* (2013.01); *G02B 15/12* (2013.01)

(58) Field of Classification Search
CPC .... G02B 15/161; G02B 15/163; G02B 15/177
See application file for complete search history.

(56) References Cited

U.S. PATENT DOCUMENTS 7,593,163 B2   9/2009   Yamada et al.
8,223,436 B2   7/2012   Sugita et al.
(Continued)

FOREIGN PATENT DOCUMENTS

JP    58123515 A    7/1983
JP    63081312 A    4/1988
(Continued)

OTHER PUBLICATIONS

Office Action issued on Jun. 25, 2014 in related Japanese application, 2012109239.

*Primary Examiner* — Sinh Tran
*Assistant Examiner* — Selam T Gebriel
(74) *Attorney, Agent, or Firm* — Andrews Kurth Kenyon LLP

(57) ABSTRACT

A teleconverter includes a master lens apparatus-side mount on which a master lens apparatus is mounted, a camera body-side mount on which a camera body is mounted, and a converter lens unit that has a negative refracting power for mounting the master lens apparatus thereon to obtain a lens system having a focal length longer than that of the master lens apparatus, the converter lens unit including a first lens group on the master lens apparatus side and a second lens group on the camera body side with an on longest air separation interposed between them, the first lens group has positive refracting power, and the second lens group has negative refracting power, with satisfaction of the following condition (1):

$$-1.53 < f1/f < -0.66 \qquad (1)$$

where f is the focal length of a whole system of the converter lens unit, and f1 is the focal length of the first lens group.

9 Claims, 13 Drawing Sheets

(51) Int. Cl.
*G02B 15/14* (2006.01)
*G03B 17/56* (2006.01)
*G02B 13/02* (2006.01)
*G02B 15/12* (2006.01)

(56) References Cited

U.S. PATENT DOCUMENTS

| | | |
|---|---|---|
| 2001/0004297 A1 | 6/2001 | Suzuki |
| 2007/0019303 A1 | 1/2007 | Hamano et al. |
| 2009/0080087 A1* | 3/2009 | Yamada ................ G03B 19/12 |
| | | 359/672 |
| 2012/0075716 A1* | 3/2012 | Kon .................... G02B 15/173 |
| | | 359/684 |

FOREIGN PATENT DOCUMENTS

| | | |
|---|---|---|
| JP | 63148222 A | 6/1988 |
| JP | 63200113 A | 8/1988 |
| JP | 64042617 A | 2/1989 |
| JP | 01129219 A | 5/1989 |
| JP | 02293710 A | 12/1990 |
| JP | 05346541 A | 12/1993 |
| JP | 06175021 A | 6/1994 |
| JP | 07174968 A | 7/1995 |
| JP | 07318803 A | 12/1995 |
| JP | 2002287026 A | 10/2002 |
| JP | 2004-226648 | 8/2004 |
| JP | 2003-279780 | 2/2005 |
| JP | 2005-107261 | 4/2005 |
| JP | 2009-080176 | 4/2009 |
| JP | 2010-191211 | 9/2010 |
| JP | 2011-081111 | 4/2011 |

* cited by examiner

Converter lens
Example 1

Converter lens
Example 5

Mater lens
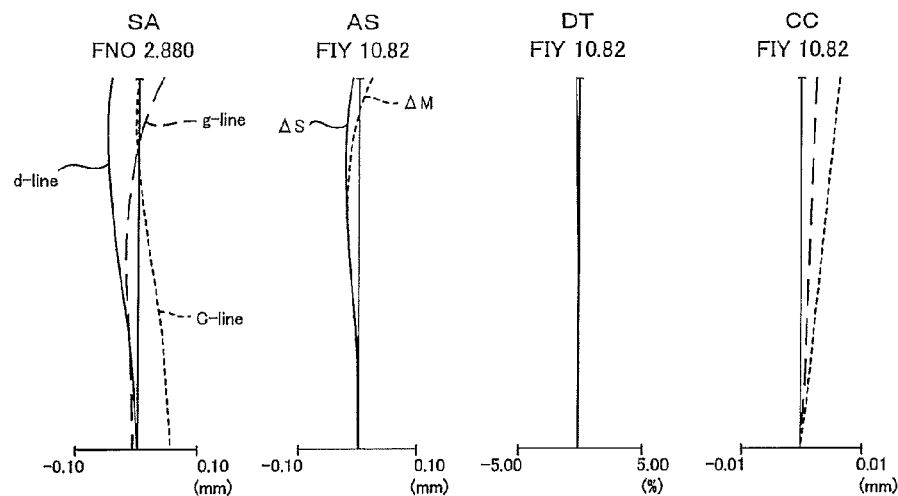
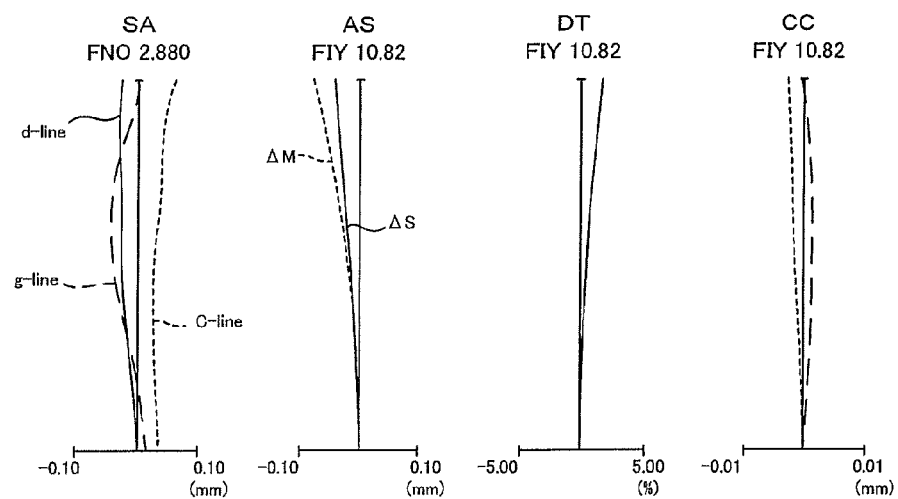

Converter lens
Example 1

SA
FNO 4.028

AS
FIY 10.82

DT
FIY 10.82

CC
FIY 10.82

SA
FNO 4.029

AS
FIY 10.82

DT
FIY 10.82

CC
FIY 10.82

Converter lens
Example 2

Converter lens
Example 3

SA
FNO 4.028

AS
FIY 10.82

DT
FIY 10.82

CC
FIY 10.82

SA
FNO 4.028

AS
FIY 10.82

DT
FIY 10.82

CC
FIY 10.82

Converter lens
Example4

SA
FNO 4.029

AS
FIY 10.82

DT
FIY 10.82

CC
FIY 10.82

SA
FNO 4.029

AS
FIY 10.82

DT
FIY 10.82

CC
FIY 10.82

Converter lens
Example 5
(a)
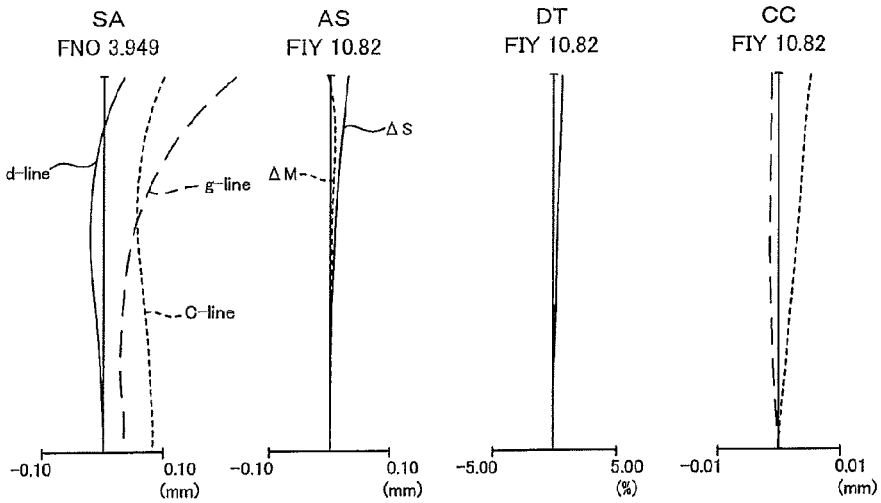
(b)
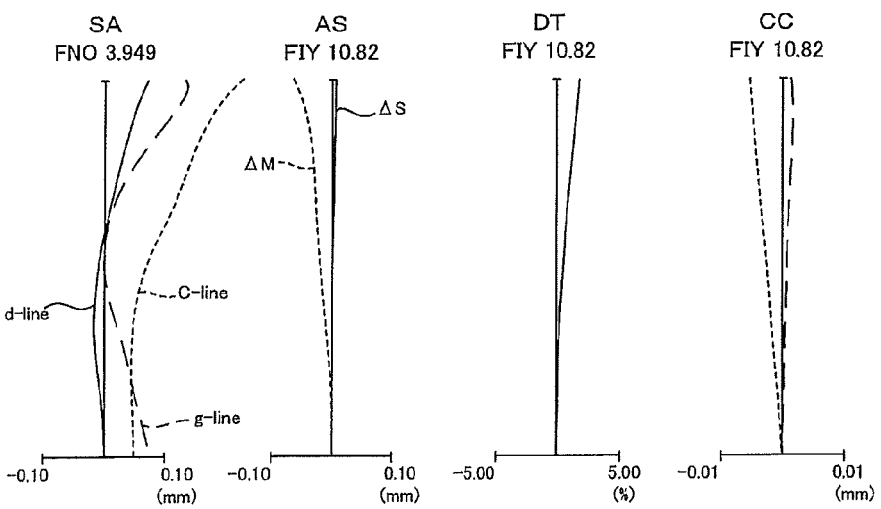

TELECONVERTER MOUNTED ON A MASTER LENS APPARATUS TO OBTAIN A LENS SYSTEM HAVING A FOCAL LENGTH LONGER THAN THAT OF THE MASTER LENS APPARATUS, AND IMAGING SYSTEM COMPRISING THE SAME

This is a divisional application on U.S. application Ser. No. 13/892,253, filed on May 11, 2013, and claims the benefit of Japanese Application No. 2012-109239 filed in Japan on May 11, 2012, the contents of which are incorporated by this reference.

BACKGROUND OF THE INVENTION

The present invention relates to a tele-converter that is mounted on a master lens apparatus to obtain a lens system having a focal length longer than that of the master lens apparatus, and an imaging system comprising the same.

So far, there has been a rear teleconverter known in the art that comprises mounts corresponding to the mount of a master lens apparatus and the mount of a camera body, wherein a converter lens is interposed between the master lens apparatus and the camera body via those mounts to extend or elongate the focal length of the whole lens system.

Such rear teleconverters are convenient to and preferably used by those who use single-lens reflex cameras with interchangeable lenses in general and those who carry out telephotography, because of capable of making the focal length longer simply. Such rear teleconverter lenses, for instance, are set forth in Patent Publications 1 to 6.
Patent Publication 1: JP(A) 2004-226648
Patent Publication 2: JP(A) 2005-043788
Patent Publication 3: JP(A) 2005-107261
Patent Publication 4: JP(A) 2009-080176
Patent Publication 5: JP(A) 2010-191211
Patent Publication 6: JP(A) 2011-081111

SUMMARY OF THE INVENTION

In one embodiment, the invention provides a teleconverter comprising:
a master lens apparatus-side mount on which a master lens apparatus is mounted,
a camera body-side mount on which a camera body is mounted, and
a converter lens unit that has a generally negative refracting power for mounting said master lens apparatus thereon to obtain a lens system having a focal length longer than that of said master lens apparatus, wherein:
said converter lens unit comprises a first lens group on said master lens apparatus side and a second lens group on said camera body side with an on-axis longest air separation interposed there-between,
said first lens group has positive refracting power, and
said second lens group has negative refracting power, with satisfaction of the following condition (1):

$$-1.53 < f1/f < -0.66 \tag{1}$$

where f is a focal length of a whole system of said converter lens unit, and
f1 is a focal length of said first lens group.

In one embodiment, the invention provides a teleconverter comprising:
a master lens apparatus-side mount on which a master lens apparatus is mounted,
a camera body-side mount on which a camera body is mounted, and
a converter lens unit that has a generally negative refracting power for mounting said master lens apparatus thereon to obtain a lens system having a focal length longer than that of said master lens apparatus, wherein:
said converter lens unit satisfies the following condition (6):

$$1.1 < D/fb < 3.0 \tag{6}$$

where D is an on-axis thickness of said converter lens unit, and
fb is an on-axis distance in air from an exit surface of said converter lens unit to an image plane when said teleconverter lens is attached to said master lens apparatus.

In one embodiment, the invention provides a teleconverter comprising:
a master lens apparatus-side mount on which a master lens apparatus is mounted,
a camera body-side mount on which a camera body is mounted, and
a converter lens unit which has a generally negative refracting power for mounting said master lens apparatus thereon to obtain a lens system having a focal length longer than that of said master lens apparatus, wherein:
said converter lens unit comprises a first lens group on said master lens apparatus side and a second lens group on said camera body side with an on-axis longest air separation interposed there-between,
said first lens group has positive refracting power,
said second lens group has negative refracting power,
said converter lens unit consists of five lenses: in order along an optical path, a first positive lens, a first negative lens, a second positive lens, a second negative lens, and a third positive lens,
said first lens group consists of one lens: said first positive lens, and
said second lens consists of four lenses: said first negative lens, said second positive lens, said second negative lens, and said third positive lens.

In one embodiment, the invention provides an imaging system, comprising:
a master lens apparatus,
a camera body, and
a teleconverter attachable between said master lens apparatus and said camera body, wherein:
said camera body includes an imaging device that is located in a position of an image formed by a combined optical system of said master lens apparatus and said teleconveter, and operable to convert the image formed by said combined optical system into electric signals.

Still other objects and advantages of the invention will in part be obvious and will in part be apparent form the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 7A-7D show a set of aberration diagrams for the master lens at the wide-angle end.

FIGS. 7E-7H show a set of aberration diagrams for the master lens at the telephoto end.

FIGS. 12A-12D show a set of aberration diagrams for the converter lens of Example 5 at the wide-angle end.

FIGS. 12E-12H show a set of aberration diagrams for the converter lens of Example 5 at the telephoto end.

DESCRIPTION OF EXEMPLARY EMBODIMENTS

Figure 1A:
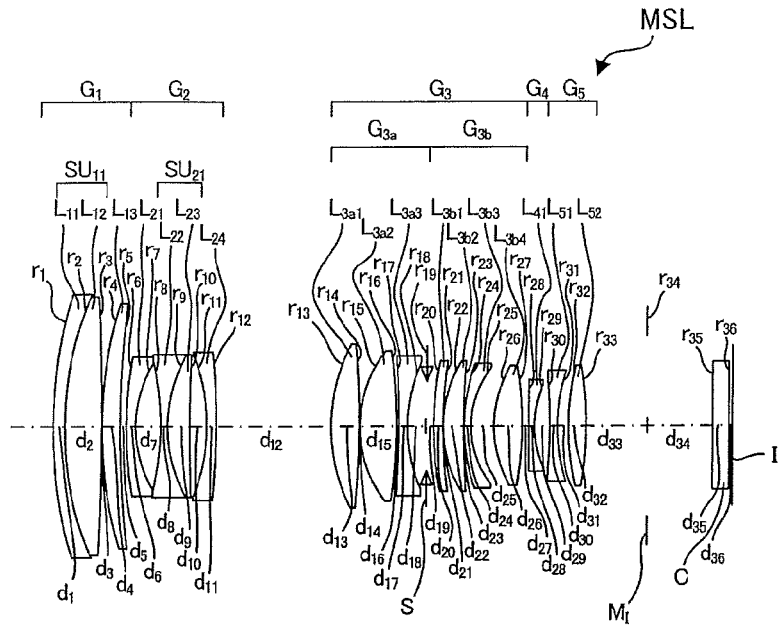
FIG. 1A is a sectional view of the master lens at the wide-angle end, as taken apart along the optical axis.

In recent years, lens-interchangeable camera systems that dispense with any quick-return mirror and make their flange back short have acquired wide popularity because of their small-format, low-profile layout. However, the teleconverters disclosed in Patent Publications 1-6 are tailored to conventional single-lens reflex cameras, laying its base on long flange backs, so they are not compatible with small-format, low-profile new camera systems. The teleconverters of Patent Publications 1-6 all involve much more lenses, adding up to cost.

According to the first aspect of the invention, there is a teleconverter provided that may also be applied to a new camera system having a short flange back to make the focal length of its master lens long in a simple manner. According to the second aspect of the invention, there is a teleconverter provided that works more in favor of cost reductions. According to a further aspect of the invention, there is an imaging system provided that comprises such a teleconverter.

The inventive teleconverter is embodied as follows.

The inventive teleconverter typically comprises:

a master lens apparatus-side mount on which a master lens apparatus is mounted, a camera body-side mount on which a camera body is mounted, and a converter lens unit which has a generally negative refracting power for mounting said master lens apparatus thereon to obtain a lens system having a focal length longer than that of said master lens apparatus, wherein:

said converter lens unit comprises a first lens group on said master lens apparatus side and a second lens group on said camera body side with an on-axis longest air separation interposed there-between, said first lens group has positive refracting power, and said second lens group has negative refracting power, preferably with satisfaction of the following condition (1):

$$-1.53 < f1/f < -0.66 \quad (1)$$

where f is the focal length of said whole converter lens system, and f1 is the focal length of said first lens group.

The converter lens unit used in the inventive teleconverter is made up of the first lens group and the second lens group with the on-axis longest air separation interposed between them. There is then a power profile such that the first lens group has positive refracting power and the second lens group has negative refracting power so that the converter lens unit itself is of the telephoto type of positive refracting power and negative refracting power. Such a power profile enables the principal point positions to be spaced more away from the center of the converter lens unit. In addition, it makes sure the converter lens unit has a certain magnification while the teleconverter is located within a small space between the master lens apparatus and the camera body.

Condition (1) defines the preferable focal length of the first lens group.

By keeping the focal length of the first lens group against exceeding the upper limit to Condition (1) thereby keeping the positive refracting power of the first lens group moderate, the negative refracting power of the second lens group may be kept small too, for facilitation of aberration correction. This may also lead to a decrease in the lenses count, working in favor of size and cost reductions of the teleconverter.

By keeping the focal length of the first lens group against running short of the lower limit to Condition (1) thereby making sure the first lens group has sufficient positive power, the effect of the telephoto type may be enhanced so that the teleconverter is more advantageously be used with camera bodies having a short flange back. This may also work more in favor of size reductions of the whole imaging system.

Preferably, the inventive teleconverter should satisfy the following Condition (2):

$$-3.0 < f/(B \times D) < -1.2 \quad (2)$$

where B is the magnification of said converter lens unit, and

D is the on-axis thickness of said converter lens unit.

To be well compatible with the camera body having a short flange back, it is preferable to increase the negative refracting power of the whole system that defines the converter lens unit. To take hold of magnification while reducing any increase in the lenses count, on the other hand, it is preferable to impose some moderate limitation on the negative refracting power of the converter lens unit thereby achieving full correction of aberrations with just only a limited space. Condition (2) defines the preferable whole focal length of the converter lens unit; it is preferable to satisfy Condition (2) for the magnification and thickness of the converter lens unit.

As the negative refracting power is kept moderately weak in such a way as not to exceed the upper limit to Condition (2), it may work more in favor of aberration reductions upon the attachment of the converter.

As the moderate negative refracting power is ensured in such a way as not to fall short of the lower limit to Condition (2), it facilitates taking hold of the desired magnification.

The inventive teleconverter should also preferably satisfy the following Condition (3):

$$0.04 < d12/D < 0.3 \quad (3)$$

where d12 is an air separation between said first lens group and said second lens group, and D is the on-axis thickness of said converter lens unit.

Making sure the air separation between the first lens group and the second lens group may work in favor of correction of field curvatures in general and sagittal field curvature in particular. To this end, it is preferable to satisfy Condition (3).

Not exceeding the upper limit to Condition (3) may work more in favor of size reductions because of reducing full length increases.

Not running short of the lower limit to Condition (3) is preferable for making sure the effect on aberration correction.

Further, the aforesaid converter lens unit should preferably consist of five lenses: in order along the optical path, the first positive lens, the first negative lens, the second positive lens, the second negative lens, and the third positive lens, wherein:

the aforesaid first lens group consists of one lens: said first positive lens, and said second lens group consists of four lenses: said first negative lens, said second positive lens, said second negative lens, and said third positive lens.

Such a symmetrical layout having a limited lenses count may work more in favor of reductions in various aberrations. In the case of the teleconverter in particular, it is preferable for the second lens group to have strong negative refracting power. For this reason, it is preferable to use two negative lenses and two positive lenses thereby making sure the negative power and, at the same time, aberration reductions.

It is to be noted that as could be seen from the examples given later, if three lenses: the first negative lens, the second positive lens and the second negative lens are cemented to one another, it is then possible to reduce the influences of decentration between them. Alternatively, one of the negative lenses may be cemented to the second positive lens alone.

For correction of coma, the third positive lens should preferably be made up of a single lens. Especially if the third positive lens is in a double-convex shape, it may work in favor of correction of coma.

Preferably, two negative lenses in the second lens group should each be a double-concave lens, and two positive lenses in the second lens group should each be a double-convex lens. This may work much more in favor of making sure the second lens group has negative refracting power, and making sure the positive lenses have a function of canceling various aberrations.

Still further, the inventive teleconverter should preferably satisfy the following Conditions (4) and (5):

$$15 < vd1 < 35 \quad (4)$$

$$50 < vd5 < 100 \quad (5)$$

where vd1 is the Abbe constant of said first positive lens, and
vd5 is the Abbe constant of said third positive lens.

Both Conditions (4) and (5) are preferably provided for good correction of chromatic aberrations.

Not exceeding the upper limit to Condition (4) may work in favor of cancellation of chromatic aberrations likely to occur at the second lens group of negative refracting power, because the dispersion of the first lens group is enhanced. In addition, this may facilitate making the refractive index of the first lens group high, working in favor of the telephoto layout effect and correction of spherical aberrations.

Running short of the lower limit to Condition (4) is preferable for cutting down the material cost of the first positive lens.

To make the first positive lens satisfy Condition (4), it is preferable for the Abbe constant of the third positive lens not to fall short of the lower limit to Condition (5), because the influence of the third positive lens on chromatic aberration of magnification is easily mitigated.

Not exceeding the upper limit to Condition (5) is preferable for cutting down the material cost of the third positive lens.

The inventive teleconverter comprises:

a master lens apparatus-side mount on which a master lens apparatus is mounted, a camera body-side mount on which a camera body is mounted, and a converter lens unit which has a generally negative refracting power for mounting said master lens apparatus thereon to obtain a lens system having a focal length longer than that of said master lens apparatus, wherein:

said converter lens unit preferably satisfies the following condition (6):

$$1.1 < D/fb < 3.0 \quad (6)$$

where D is the on-axis thickness of said converter lens unit, and fb is the on-axis distance in air from the exit surface of said converter lens unit to the image plane when said teleconverter lens is attached to said master lens apparatus.

When it comes to the imaging system in which the camera body has a short flange back, the teleconverter is going to be located in a narrow space. To make sure the desired magnification and implement full correction of aberrations on that presupposition, it is preferable to satisfy Condition (6).

Not exceeding the upper limit to Condition (6) is preferable for slimming down the teleconverter and making sure the moderate magnification.

Not running short of the lower limit to Condition (6) is preferable for taking hold of the space for receiving lenses, and making it easy to achieve aberration correction capability.

Preferably, the inventive teleconverter comprises:

a master lens apparatus-side mount on which a master lens apparatus is mounted, a camera body-side mount on which a camera body is mounted, and a converter lens unit which has a generally negative refracting power for mounting said master lens apparatus thereon to obtain a lens system having a focal length longer than that of said master lens apparatus, wherein:

said converter lens unit comprises a first lens group on said master lens apparatus side and a second lens group on said camera body side with the on-axis longest air separation interposed there-between, said first lens group has positive refracting power,
said second lens group has negative refracting power, said converter lens unit consists of five lenses: in order along the optical path, a first positive lens, a first negative lens, a second positive lens, a second negative lens, and a third positive lens, said first lens group consists of one lens: said first positive lens, and said second lens consists of four lenses: said first negative lens, said second positive lens, said second negative lens, and said third positive lens.

Such arrangement corresponds to an embodiment of the second aspect of the invention. Such a symmetrical layout having a lower lenses count may work in favor of reductions in various aberrations. In the case of the teleconverter in particular, it is preferable for the second lens group to have strong negative refracting power. To this end, it is preferable to use two negative lenses and two positive lenses to make sure the negative refracting power and aberration reductions.

The inventive imaging system preferably comprises:
a master lens apparatus,
a camera body,
a teleconverter attachable between said master lens apparatus and said camera body, wherein:
said teleconverter is the inventive one,
said camera body is located in a position of an image formed by a combined optical system of said master lens apparatus and said teleconverter, and includes an imaging device for converting the image formed by said combined optical system into electric signals.

Preferably, the inventive imaging system should satisfy the following Condition (7):

$$0.6 < fb/IH < 1.6 \quad (7)$$

where fb is the on-axis distance in air from the exit surface of said converter lens unit to the image plane when said teleconverter lens is attached to said master lens apparatus, and IH is the maximum image height of said imaging system.

When the teleconverter is attached to the camera body too, the proper BF value also depends on the size of the imaging plane, corresponding to the flange back length. In particular, it is preferable to provide proper determination of the angle of incidence of off-axis light beams on the imaging device.

As the space of the converter lens unit for receiving lenses is ensured in such a way as not to exceed the upper limit to Condition (7), it may work in favor of making sure the telephoto layout effect while keeping the full length of the imaging system short.

Not running short of the lower limit to Condition (7) may work in favor of making the angle of incidence on the imaging plane small (spacing the exit pupil away from the imaging plane) while keeping the diameter of the exit surface of the rear converter small.

More preferably, the requirements for the respective embodiments of the invention should be satisfied mutually at the same time.

More preferably, the upper and lower limit values of each condition should be limited as follows, because it could work much more.

Of Condition (1), the lower limit value should more preferably be set at −1.51, and the upper limit value should more preferably be set at −0.75, and especially −0.80.

Of Condition (2), the lower and upper limit values should more preferably be set at −2.8 and −1.70, respectively.

Of Condition (3), the lower and upper limit values should more preferably be set at 0.10 and 0.25, respectively.

Of Condition (4), the lower and upper limit values should more preferably be set at 18 and 32, respectively.

Of Condition (5), the lower and upper limit values should more preferably be set at 60 and 85, respectively.

Of Condition (6), the lower and upper limit values should more preferably be set at 1.3 and 2.5, respectively.

Of Condition (7), the lower and upper limit values should more preferably be set at 0.9 and 1.4, respectively.

According to the present invention, the teleconverter capable of making the focal length of a master lens longer in a simple manner could be provided for use even on a new camera system having a short flange back. Also, the teleconverter working in favor of cost reductions could be provided. Further, the invention could provide an imaging system incorporating such a teleconverter.

The teleconverters according to some embodiments of the invention will now be explained with reference to the accompanying drawings.

Reference will first be made to the master lens MSL used with the inventive teleconverter.

Figure 1B:
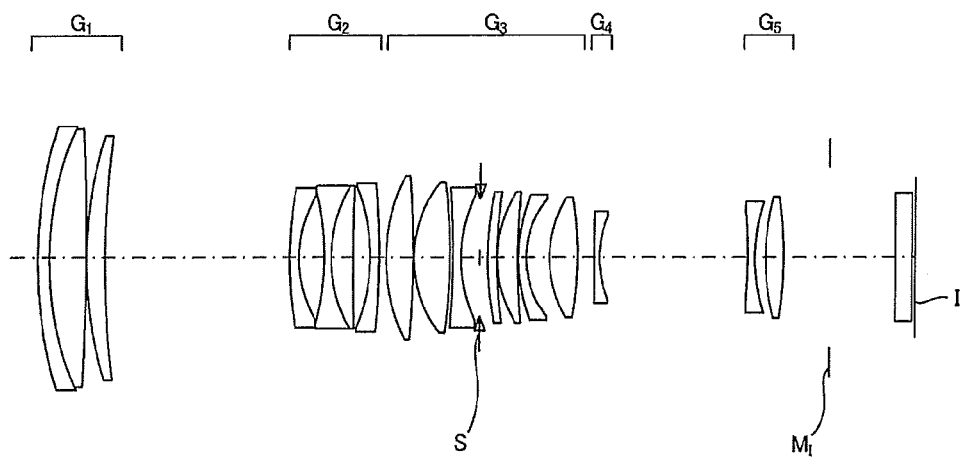
FIG. 1B is a sectional view of the master lens at the telephoto end, as taken apart along the optical axis.

FIG. 1 is a sectional view of the master lens MSL. More specifically, FIGS. 1A and 1B are sectional views of the master lens MSL at the wide-angle end and the telephoto end, respectively.

The master lens MSL is a telephoto zoom lens having a focal length variable between about 40 mm and about 150 mm and an Fno of about 2.8.

As shown in FIG. 1, the master lens MSL is made up of, in order from the object side to the image side, the first lens group $G_1$ of positive refracting power, the second lens group $G_2$ of negative refracting power, the third lens group $G_3$ of positive refracting power, the fourth lens group $G_4$ of negative refracting power, and the fifth lens group $G_5$ of positive refracting power. In FIG. 1, S, $M_f$, C, and I stand for an aperture stop, an image side-mount surface, a cover glass, and an image plane, respectively.

The first lens group $G_1$ is made up of, in order from the object side to the image side, a cemented lens $SU_{11}$ of a negative meniscus lens $L_{11}$ convex on its object side and a double-convex positive lens $L_{12}$, and a positive meniscus lens $L_{13}$ convex on its object side.

The second lens group $G_2$ is made up of, in order from the object side to the image side, a negative meniscus lens $L_{21}$ convex on its object side, a cemented lens $SU_{21}$ of a double-concave negative lens $L_{22}$ and a positive meniscus lens $L_{23}$ convex on its object side, and a negative meniscus lens $L_{24}$ convex on its image side.

The third lens group G3 is made up of, in order from the object side to the image side, the $3a^{th}$ lens group $G_{3a}$ and the $3b^{th}$ lens group $G_{3b}$. The $3a^{th}$ lens group $G_{3a}$ is made up of, in order from the object side to the image side, a double-convex positive lens $L_{3a1}$, a double-convex positive lens $L_{3a2}$, and a double-concave negative lens $L_{3a3}$, and the $3b^{th}$ lens group $G_{3b}$ is made up of, in order from the object side to the image side, a positive meniscus lens $L_{3b1}$ convex on its object side, a positive meniscus lens $L_{3b2}$ convex on its object side, a negative meniscus lens $L_{3b3}$ convex on its object side, and a double-convex positive lens $L_{3b4}$.

There is the aperture stop S interposed between the $3a^{th}$ lens group $G_{3a}$ and the $3b^{th}$ lens group $G_{3b}$ in the third lens group $G_3$.

The fourth lens group $G_4$ is made up of one double-concave negative lens $L_{41}$.

The fifth lens group $G_5$ is made up of a double-concave negative lens $L_{51}$, and a double-convex positive lens $L_{52}$.

Reference will then be made to how the respective lens groups in the master lens MSL move upon zooming from the wide-angle end to the telephoto end.

During zooming, the first lens group $G_1$, the second lens group $G_2$, the third lens group $G_3$, the fourth lens group $G_4$, and the fifth lens group $G_5$ move independently.

From the wide-angle end to the telephoto end, the first lens group $G_1$ moves just only toward the object side with an increasing spacing between it and the second lens group $G_2$.

From the wide-angle end to the telephoto end, the second lens group $G_2$ moves toward the object side with an increasing spacing between the first lens group $G_1$ and it and a decreasing spacing between it and the third lens group $G_3$. The second lens group $G_2$ is positioned more on the object side at the telephoto end than at the wide-angle end.

From the wide-angle end to the telephoto end, the third lens group $G_3$ moves together with the aperture stop S with a decreasing spacing between the second lens group $G_2$ and it and an increasing spacing between it and the fourth lens group $G_4$. The third lens group $G_3$ is positioned more on the object side at the telephoto end than at the wide-angle end.

From the wide-angle end to the telephoto end, the fourth lens group $G_4$ moves toward the object side with an increasing spacing between the third lens group $G_3$ and it and an increasing spacing between it and the fifth lens group $G_5$. The fourth lens group $G_4$ is positioned more on the object side at the telephoto end than at the wide-angle end.

From the wide-angle end to the telephoto end, the fifth lens group $G_5$ moves toward the image side with an increasing spacing between the fourth lens group $G_4$ and it. The fifth lens group $G_5$ is positioned more on the image side at the telephoto end than at the wide-angle end.

Four aspheric surfaces are used: two at both surfaces $r_{20}$ and $r_{21}$ of the object-side positive meniscus lens $L_{3b1}$ in the $3b^{th}$ lens group $G_{3b}$, and two at both surfaces $r_{28}$ and $r_{29}$ of the double-concave negative lens $L_{41}$ forming the fourth lens group $G_4$.

The converter lenses TCL in Examples 1 to 5 of the invention will now be explained with reference to FIGS. 2 to 6. More specifically, FIGS. 2 to 6 are sectional views of the converter lenses TCL of Examples 1 to 5 as taken apart along the optical axis.

Figure 2:
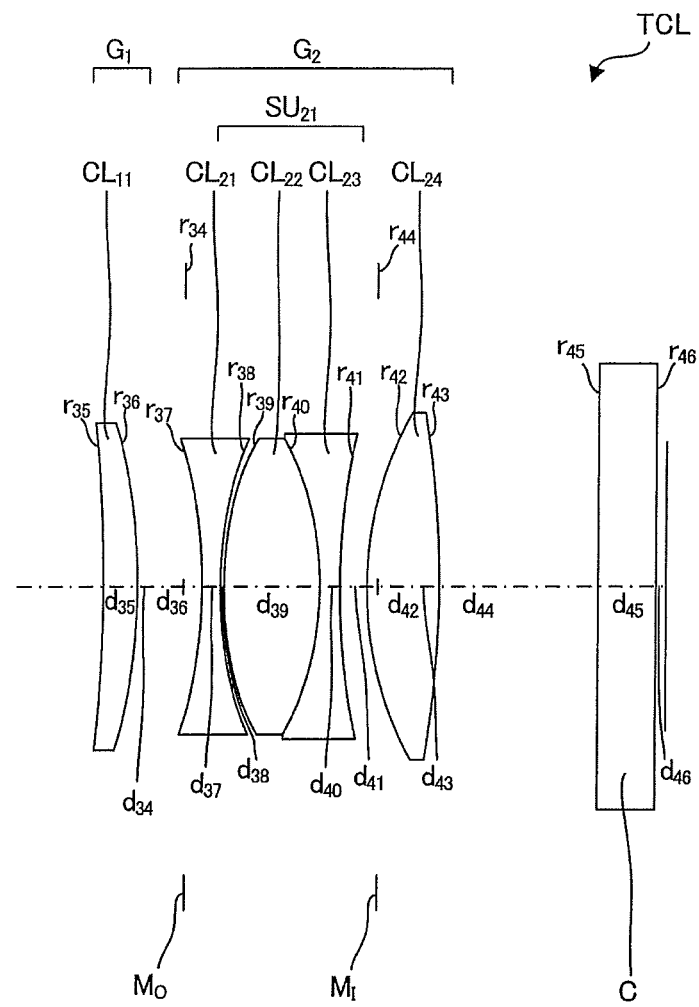
FIG. 2 is a sectional view of the converter lens of Example 1 as taken apart along the optical axis.

FIG. 2 is a sectional view of the converter lens TCL of Example 1.

As shown in FIG. 2, the converter lens TCL of Example 1 is made up of, in order from the object side to the image side, the first lens group $G_1$ of positive refracting power, and the second lens group $G_2$ of negative refracting power. In FIG. 2, $M_O$, $M_I$, C, and I stand for an object side-mount surface, an image side-mount surface, a cover glass, and an image plane, respectively.

The first lens group G1 is made up of, in order from the object side to the image side, the first positive lens or one positive meniscus lens $CL_{11}$ convex on its image side.

The second lens group $G_2$ is made up of, in order from the object side to the image side, the first negative lens or a double-concave negative lens $CL_{21}$, a cemented lens $SU_{21}$ of the second positive lens or a double-convex positive lens $CL_{22}$ and the second negative lens or a double-concave negative lens $CL_{23}$, and the third positive lens or a double-convex positive lens $CL_{24}$.

Figure 3:
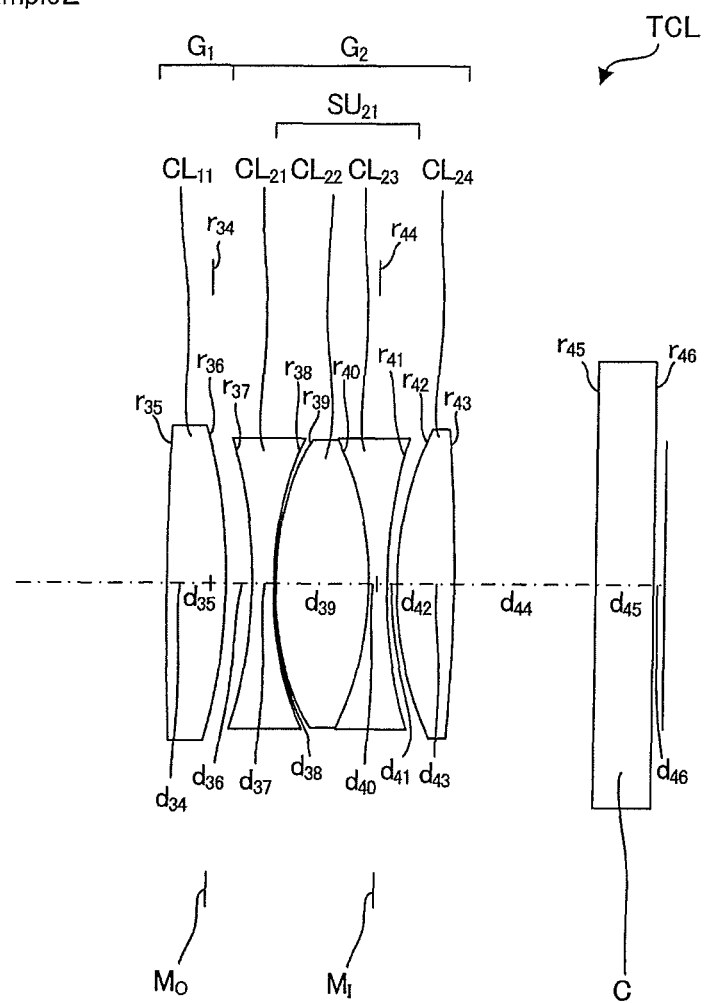
FIG. 3 is a sectional view of the converter lens of Example 2 as taken apart along the optical axis.

FIG. 3 is a sectional view of the converter lens TCL of Example 2.

As shown in FIG. 3, the converter lens TCL of Example 2 is made up of, in order from the object side to the image side, the first lens group $G_1$ of positive refracting power, and the second lens group $G_2$ of negative refracting power. In FIG. 3, $M_O$, $M_I$, C, and I stand for an object side-mount surface, an image side-mount surface, a cover glass, and an image plane, respectively.

The first lens group G1 is made up of, in order from the object side to the image side, the first positive lens or one double-convex positive lens $CL_{11}$.

The second lens group $G_2$ is made up of, in order from the object side to the image side, the first negative lens or a double-concave negative lens $CL_{21}$, a cemented lens $SU_{21}$ of the second positive lens or a double-convex positive lens $CL_{22}$ and the second negative lens or a double-concave negative lens $CL_{23}$, and the third positive lens or a double-convex positive lens $CL_{24}$.

Figure 4:
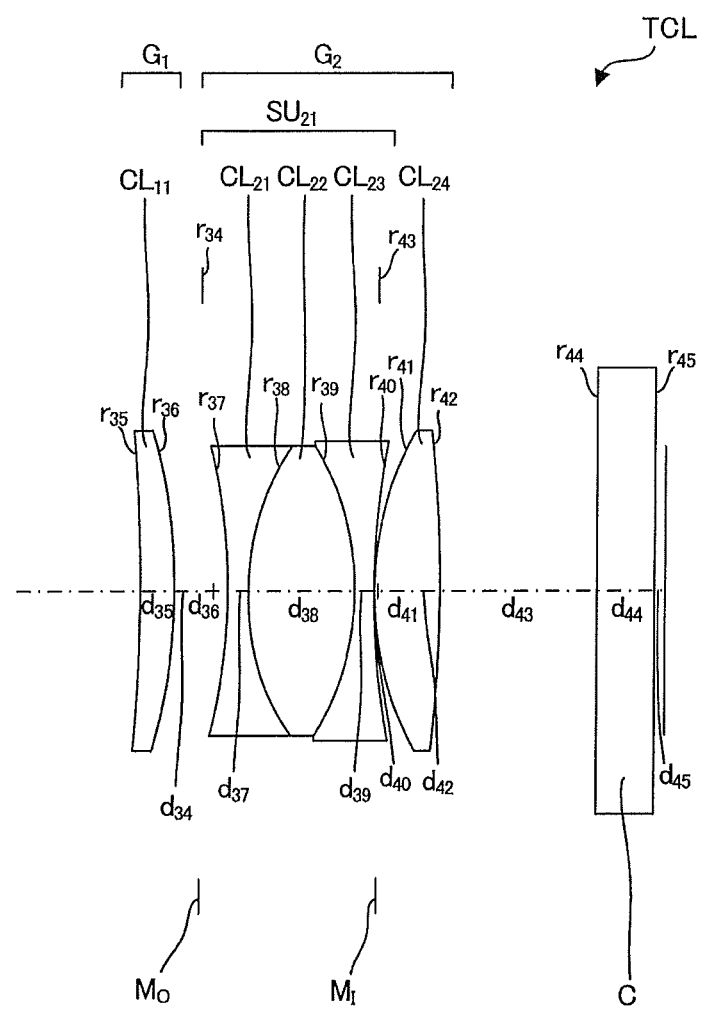
FIG. 4 is a sectional view of the converter lens of Example 3 as taken apart along the optical axis.

FIG. 4 is a sectional view of the converter lens TCL of Example 3.

As shown in FIG. 4, the converter lens TCL of Example 3 is made up of, in order from the object side to the image side, the first lens group $G_1$ of positive refracting power, and the second lens group $G_2$ of negative refracting power. In FIG. 4, $M_O$, $M_I$, C, and I stand for an object side-mount surface, an image side-mount surface, a cover glass, and an image plane, respectively.

The first lens group G1 is made up of, in order from the object side to the image side, the first positive lens or one positive meniscus lens $CL_{11}$ convex on its image side.

The second lens group $G_2$ is made up of, in order from the object side to the image side, a cemented lens $SU_{21}$ of the first negative lens or a double-concave negative lens $CL_{21}$, the second positive lens or a double-convex positive lens $CL_{22}$ and the second negative lens or a double-concave negative lens $CL_{23}$, and the third positive lens or a double-convex positive lens $CL_{24}$.

Figure 5:
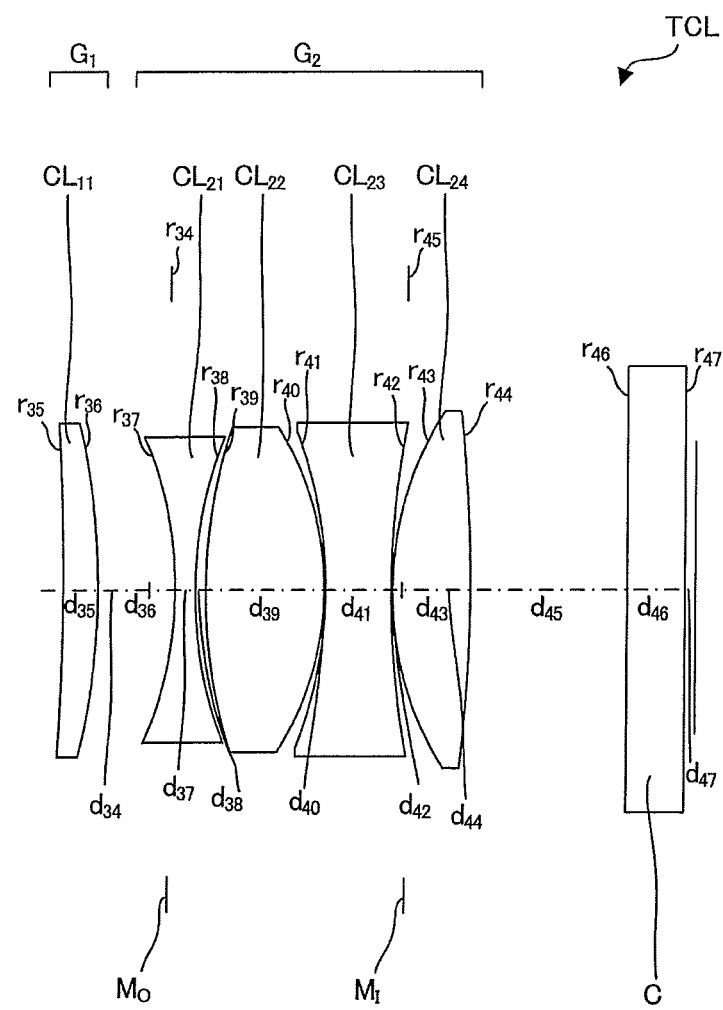
FIG. 5 is a sectional view of the converter lens of Example 4 as taken apart along the optical axis.

FIG. 5 is a sectional view of the converter lens TCL of Example 4.

As shown in FIG. 5, the converter lens TCL of Example 4 is made up of, in order from the object side to the image side, the first lens group $G_1$ of positive refracting power, and the second lens group $G_2$ of negative refracting power. In FIG. 5, $M_O$, $M_I$, C, and I stand for an object side-mount surface, an image side-mount surface, a cover glass, and an image plane, respectively.

The first lens group G1 is made up of, in order from the object side to the image side, the first positive lens or one positive meniscus lens $CL_{11}$ convex on its image side.

The second lens group $G_2$ is made up of, in order from the object side to the image side, the first negative lens or a double-concave negative lens $CL_{21}$, the second positive lens or a double-convex positive lens $CL_{22}$, the second negative lens or a double-concave negative lens $CL_{23}$, and the third positive lens or a double-convex positive lens $CL_{24}$.

Figure 6:
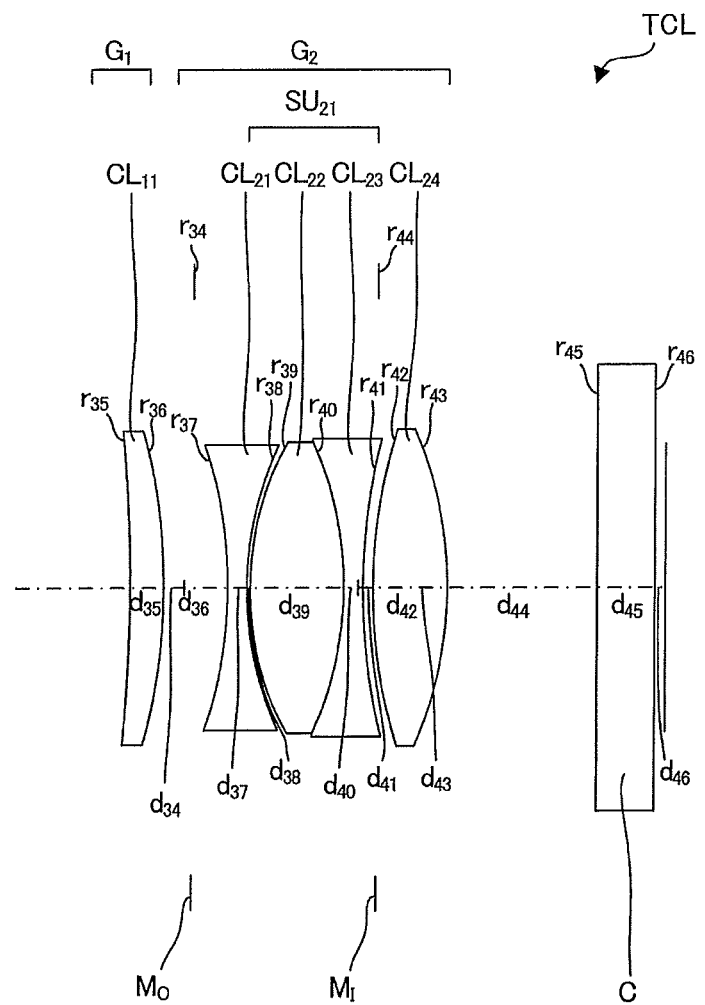
FIG. 6 is a sectional view of the converter lens of Example 5 as taken apart along the optical axis.
Figure 8A:
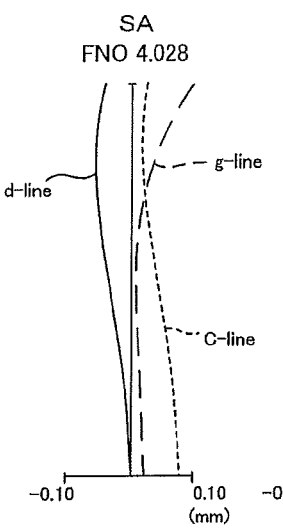
FIGS. 8A-8D show a set of aberration diagrams for the converter lens of Example 1 at the wide-angle end.
Figure 8B:
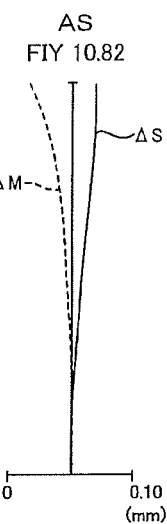
Figure 8C:
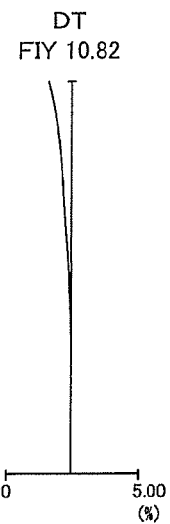
Figure 8D:
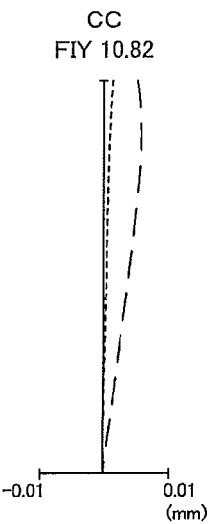
Figure 8E:
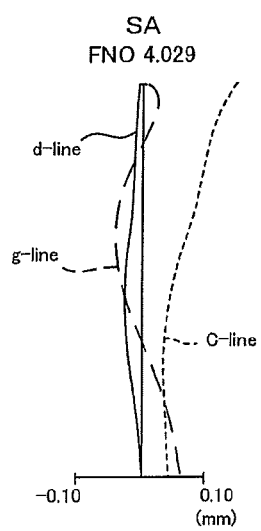
FIGS. 8E-8H show a set of aberration diagrams for the converter lens of Example 1 at the telephoto end.
Figure 8F:
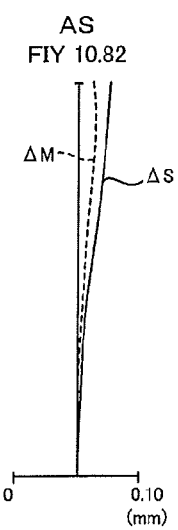
Figure 8G:
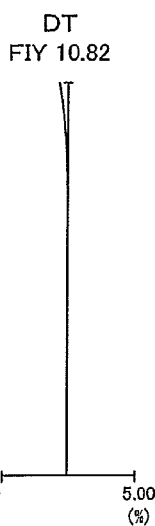
Figure 8H:
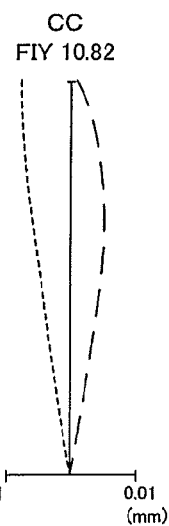
Figure 9A:
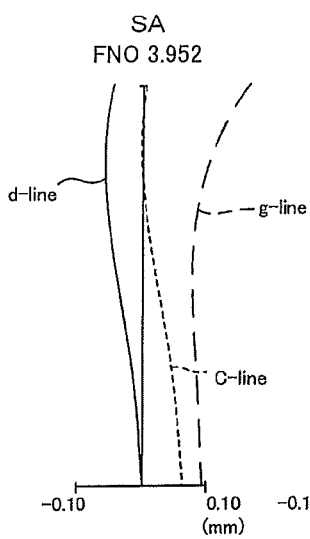
FIGS. 9A-9D show a set of aberration diagrams for the converter lens of Example 2 at the wide-angle end.
Figure 9B:
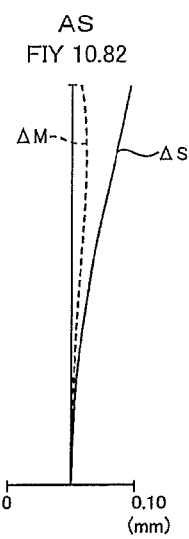
Figure 9C:
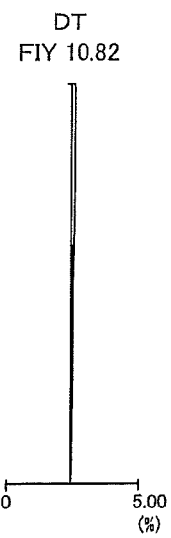
Figure 9D:
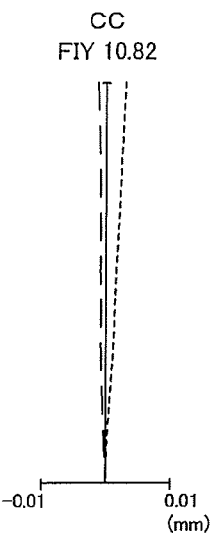
Figure 9E:
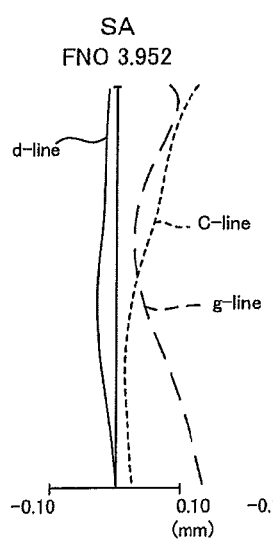
FIGS. 9E-9H show a set of aberration diagrams for the converter lens of Example 2 at the telephoto end.
Figure 9F:
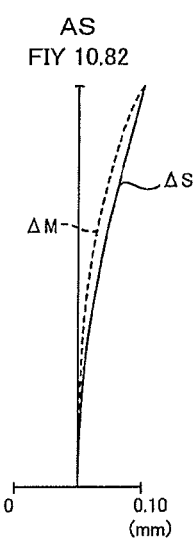
Figure 9G:
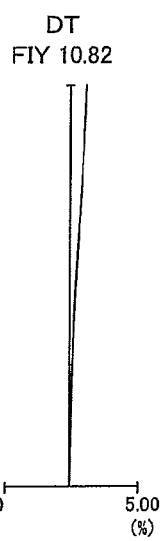
Figure 9H:
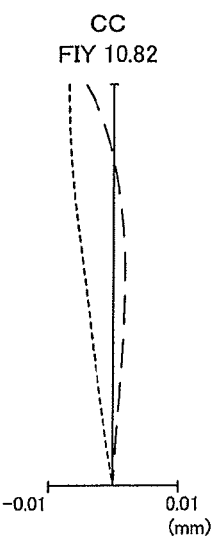
Figure 10A:
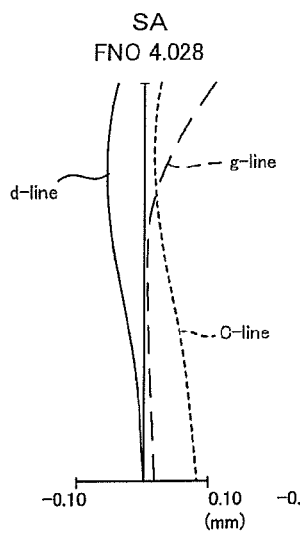
FIGS. 10A-10D show a set of aberration diagrams for the converter lens of Example 3 at the wide-angle end.
Figure 10B:
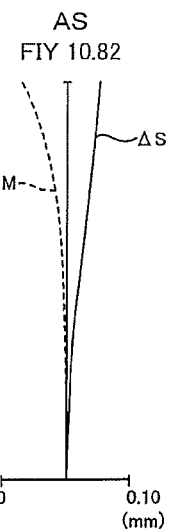
Figure 10C:
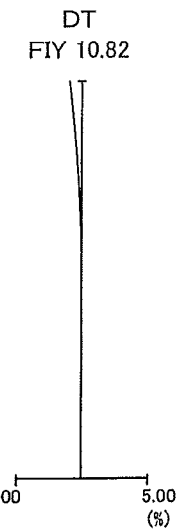
Figure 10D:
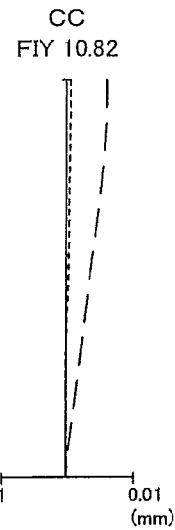
Figure 10E:
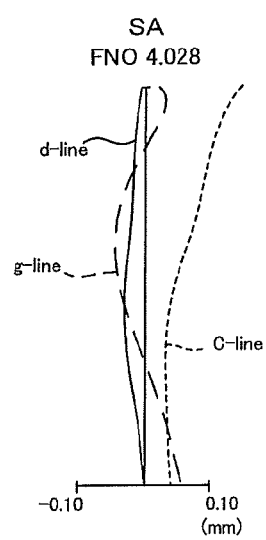
FIGS. 10E-10H show a set of aberration diagrams for the converter lens of Example 3 at the telephoto end.
Figure 10F:
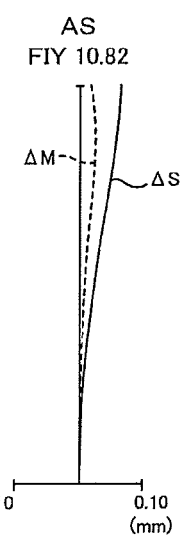
Figure 10G:
Figure 10H:
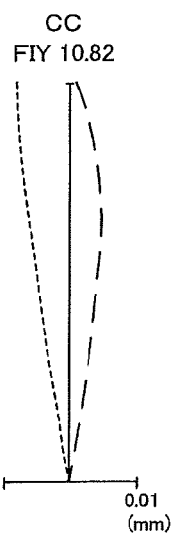
Figure 11A:
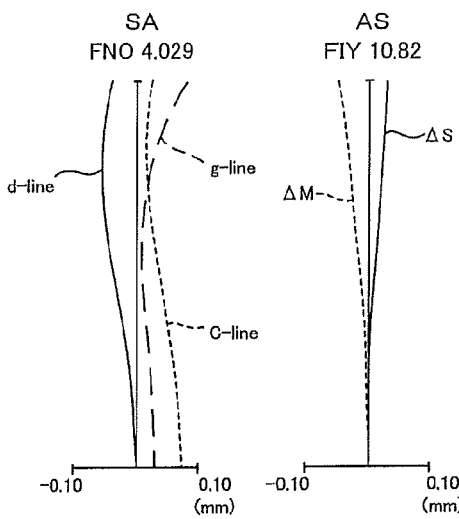
FIGS. 11A-11D show a set of aberration diagrams for the converter lens of Example 4 at the wide-angle end.
Figure 11B:
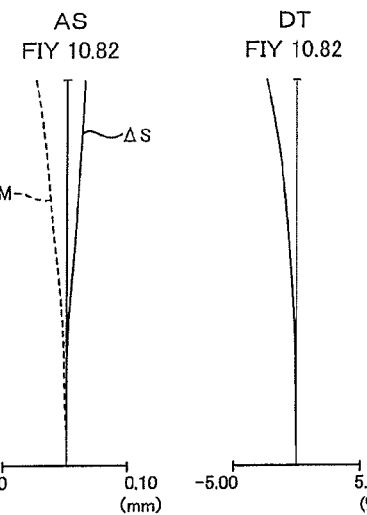
Figure 11C:
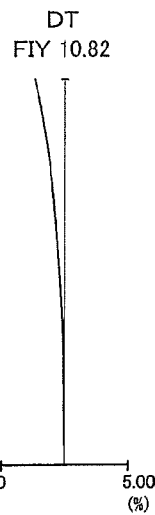
Figure 11D:
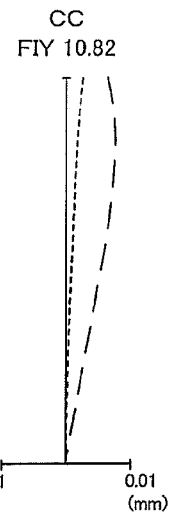
Figure 11E:
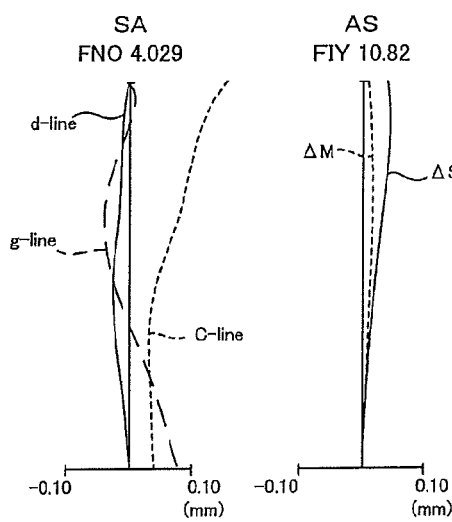
FIGS. 11E-11H show a set of aberration diagrams for the converter lens of Example 4 at the telephoto end.
Figure 11F:
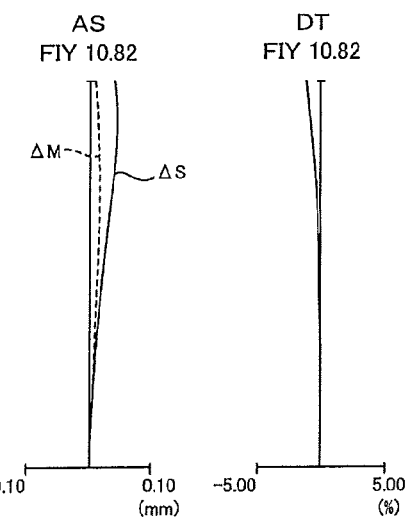
Figure 11G:
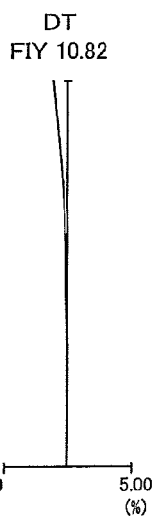
Figure 11H:
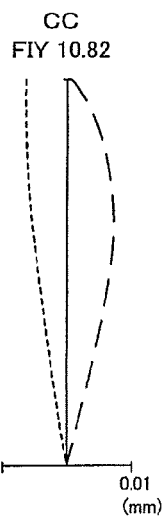

FIG. 6 is a sectional view of the converter lens TCL of Example 5.

As shown in FIG. 6, the converter lens TCL of Example 5 is made up of, in order from the object side to the image side, the first lens group $G_1$ of positive refracting power, and the second lens group $G_2$ of negative refracting power. In FIG. 6, $M_O$, $M_I$, C, and I stand for an object side-mount surface, an image side-mount surface, a cover glass, and an image plane, respectively.

The first lens group G1 is made up of, in order from the object side to the image side, the first positive lens or one positive meniscus lens $CL_{11}$ convex on its image side.

The second lens group $G_2$ is made up of, in order from the object side to the image side, the first negative lens or a double-concave negative lens $CL_{21}$, a cemented lens $SU_{21}$ of the second positive lens or a double-convex positive lens $CL_{22}$ and the second negative lens or a double-concave negative lens $CL_{23}$, and the third positive lens or a double-convex positive lens $CL_{24}$.

Set out below are a variety of numeral data (surface data, etc.) about the master lens MSL and converter lenses TCL.

The surface data include the radius of curvature r and surface separation d of each lens surface (optical surface) for each surface number, the d-line (587.6 nm) refractive index nd of each lens (optical medium), and the d-line Abbe constant vd of each lens (optical medium). The radius of curvature r and surface separation d are all given in mm. In the surface data, "∞" in the radius-of-curvature column stands for infinity.

Aspheric data include data about aspheric lens surfaces in the lens data. Aspheric surface may be represented by the following formula provided that z defines an optical axis where the direction of propagation of light is taken as positive and y defines a direction orthogonal to the optical axis.

$$z=(y^2/r)/[1+\{1-(1+K)\cdot(y/r)^2\}^{1/2}]+A4y^4+A6y^6+A8y^8+A10y^{10}$$

Note here that r is the paraxial radius of curvature, K is the conical coefficient, and A4, A6, and A8 are the aspheric coefficients of the $4^{th}$, $6^{th}$ and $8^{th}$ degrees. It is also to be noted that the capital "E" indicates that the following numerical value is a power exponent having a base of 10. For instance, "1.0E-5" means "$1.0 \times 10^{-5}$".

Various data include focal lengths, F-numbers (FNO), angles of view 2ω (°), variable surface separations d, back focuses BF (in air), full lengths (in air), and image heights, all but F-numbers and angles of view being given in mm. Note here that BF is a distance from the final lens surface to the image plane as calculated on an air basis.

WE and TE are the abbreviations for the wide-angle end and telephoto end, respectively.

The focal length data about the respective lens groups include focal lengths f1 to f5 of the respective lens groups, all given in mm.

It is to be noted that an assortment of data set out in the numeral examples are based on the presupposition of an imaging system comprising a camera body in which a master lens apparatus including the master lens MSL is attached to the teleconverters of Examples 1 to 5, and an imaging plane is located in the position of the image plane. Filters (low-pass filters, wavelength selection filters, dust-proof filters, etc.) built in the camera body, and a cover glass for the imaging device are supposed as the plane-parallel plates located just in front of the image plane, providing optical plane-parallel plate equivalents.

Mater Lens

| Surface data | | | | |
|---|---|---|---|---|
| Surface No. | r | d | nd | vd |
| 1 | 105.4432 | 2.400 | 1.85026 | 32.27 |
| 2 | 73.5728 | 8.379 | 1.49700 | 81.54 |
| 3 | −383.7411 | 0.150 | | |
| 4 | 94.5553 | 4.286 | 1.60300 | 65.44 |
| 5 | 289.6284 | D1(Variable) | | |
| 6 | 93.6811 | 2.000 | 1.83481 | 42.71 |
| 7 | 27.3524 | 5.724 | | |
| 8 | −61.7968 | 1.800 | 1.48749 | 70.23 |
| 9 | 30.7192 | 5.169 | 1.84666 | 23.78 |
| 10 | 738.2770 | 3.915 | | |
| 11 | −38.1621 | 2.000 | 1.76200 | 40.10 |
| 12 | −154.2096 | D2(Variable) | | |
| 13 | 40.1727 | 6.046 | 1.80400 | 46.57 |
| 14 | −257.1582 | 0.150 | | |
| 15 | 26.7593 | 8.420 | 1.43875 | 94.93 |
| 16 | −113.3976 | 0.569 | | |
| 17 | −102.0000 | 1.800 | 1.90366 | 31.32 |
| 18 | 33.8270 | 4.447 | | |
| 19(Stop) | ∞ | 1.500 | | |
| 20(Aspheric surface) | 53.0521 | 2.282 | 1.74320 | 49.34 |
| 21(Aspheric surface) | 113.0112 | 0.150 | | |
| 22 | 28.9682 | 4.305 | 1.64000 | 60.08 |
| 23 | 149.0277 | 0.150 | | |
| 24 | 44.8443 | 1.600 | 1.90366 | 31.32 |
| 25 | 20.3711 | 5.252 | | |
| 26 | 27.3174 | 6.191 | 1.72916 | 54.68 |
| 27 | −76.1282 | D3(Variable) | | |
| 28(Aspheric surface) | −2331.1195 | 1.200 | 1.80610 | 40.88 |
| 29(Aspheric surface) | 22.9849 | D4(Variable) | | |
| 30 | −139.5760 | 1.600 | 1.51633 | 64.14 |
| 31 | 45.7459 | 2.294 | | |
| 32 | 56.5885 | 4.072 | 1.90366 | 31.32 |
| 33 | −75.5666 | D5(Variable) | | |
| 34(Image side-mount surface) | ∞ | 15.200 | | |
| 35 | ∞ | 4.000 | 1.51633 | 64.14 |
| 36 | ∞ | 0.800 | | |
| Image plane | ∞ | | | |

| Aspheric coefficient |
|---|
| $20^{th}$ surface |
| K = 0.000, A4 = −1.1681E−05, A6 = −6.9531E−09, A8 = 7.8500E−12 |
| $21^{th}$ surface |
| K = 0.000, A4 = 5.8382E−08, A6 = −1.6466E−10, A8 = −7.4745E−13 |
| $28^{th}$ surface |
| K = 0.000, A4 = 1.7112E−06, A6 = −5.3162E−09 |
| $29^{th}$ surface |
| K = 0.000, A4 = −1.6310E−06, A6 = −1.7956E−08 |

| Various data | | |
|---|---|---|
| | WE | TE |
| Focal length | 40.80 | 147.00 |
| FNO. | 2.88 | 2.88 |
| Angle of view 2ω (°) | 29.79 | 8.28 |
| BF (in air) | 32.137 | 28.750 |
| Full length (in air) | 151.882 | 195.839 |
| Image height | 10.82 | 10.82 |
| D5 | 1.5000 | 41.2615 |
| D11 | 25.4170 | 1.5000 |
| D25 | 1.5000 | 3.5170 |
| D29 | 3.4776 | 32.9593 |
| D31 | 13.4987 | 10.1120 |

| Focal length about the respective lens groups | |
|---|---|
| f1 | 113.667 |
| f2 | −27.169 |

| | |
|---|---|
| f3 | 32.042 |
| f4 | −28.229 |
| f5 | 71.790 |

Converter Lens

Numeral Example 1

Surface data

| Surface No. | r | d | nd | vd |
|---|---|---|---|---|
| 34(Object side-mount surface) | ∞ | −5.429 | | |
| 35 | −93.2149 | 2.348 | 1.92286 | 20.88 |
| 36 | −40.5105 | 4.384 | | |
| 37 | 34.0886 | 1.300 | 1.83400 | 37.16 |
| 38 | 27.6880 | 0.239 | | |
| 39 | 25.1698 | 6.557 | 1.74077 | 27.79 |
| 40 | −22.0429 | 1.300 | 2.00100 | 29.13 |
| 41 | 47.7726 | 1.955 | | |
| 42 | 25.3471 | 5.048 | 1.49700 | 81.54 |
| 43 | −81.1748 | −4.438 | | |
| 44(Image side-mount surface) | ∞ | 15.200 | | |
| 45 | ∞ | 4.000 | 1.51633 | 64.14 |
| 46 | ∞ | 0.800 | | |
| Image plane | ∞ | | | |

Various data

| | WE | TE |
|---|---|---|
| Focal length | 57.06 | 205.60 |
| FNO. | 4.03 | 4.03 |
| Angle of view 2ω (°) | 21.85 | 6.07 |
| BF (in air) | 14.200 | 14.200 |
| Full length (in air) | 165.146 | 209.103 |
| Image height | 10.82 | 10.82 |
| Magnification | 1.40 | 1.40 |

Focal length about the respective lens groups

| | |
|---|---|
| f1 | 76.012 |
| f2 | −34.881 |

Converter Lens

Numeral Example 2

Surface data

| Surface No. | r | d | n d | vd |
|---|---|---|---|---|
| 34(Object side-mount surface) | ∞ | −2.816 | | |
| 35 | 210.9376 | 3.945 | 1.92286 | 20.88 |
| 36 | −41.1544 | 1.816 | | |
| 37 | −34.4483 | 1.300 | 2.00100 | 29.13 |
| 38 | 23.8340 | 0.219 | | |
| 39 | 21.7769 | 6.518 | 1.76182 | 26.52 |
| 40 | −21.5952 | 1.300 | 2.00100 | 29.13 |
| 41 | 34.5454 | 0.699 | | |
| 42 | 25.1598 | 3.980 | 1.52249 | 59.84 |
| 43 | −148.9062 | −5.511 | | |
| 44(Image side-mount surface) | ∞ | 15.200 | | |
| 45 | ∞ | 4.000 | 1.51633 | 64.14 |
| 46 | ∞ | 0.800 | | |
| Image plane | ∞ | | | |

Various data

| | WE | TE |
|---|---|---|
| Focal length | 55.98 | 201.70 |
| FNO. | 3.95 | 3.95 |
| Angle of view 2ω (°) | 21.86 | 6.07 |
| BF (in air) | 13.127 | 13.127 |
| Full length (in air) | 163.332 | 207.289 |
| Image height | 10.82 | 10.82 |
| Magnification | 1.40 | 1.40 |

Focal length about the respective lens groups

| | |
|---|---|
| f1 | 37.597 |
| f2 | −19.132 |

Converter Lens

Numeral Example 3

Surface data

| Surface No. | r | d | nd | vd |
|---|---|---|---|---|
| 34(Object side-mount surface) | ∞ | −4.077 | | |
| 35 | −116.5752 | 2.326 | 1.92286 | 20.88 |
| 36 | −43.6023 | 3.683 | | |
| 37 | −41.8780 | 1.300 | 1.83400 | 37.16 |
| 38 | 17.8581 | 7.464 | 1.72825 | 28.46 |
| 39 | −19.0163 | 1.300 | 2.00100 | 29.13 |
| 40 | 50.4433 | 0.150 | | |
| 41 | 23.8452 | 4.405 | 1.49700 | 81.54 |
| 42 | −121.9352 | −4.344 | | |
| 43(Image side-mount surface) | ∞ | 15.200 | | |
| 44 | ∞ | 4.000 | 1.51633 | 64.14 |
| 45 | ∞ | 0.800 | | |
| Image plane | ∞ | | | |

Various data

| | WE | TE |
|---|---|---|
| Focal length | 57.06 | 205.60 |
| FNO. | 4.03 | 4.03 |
| Angle of view 2ω (°) | 21.85 | 6.07 |
| BF (in air) | 14.200 | 14.200 |
| Full length (in air) | 165.146 | 209.103 |
| Image height | 10.82 | 10.82 |
| Magnification | 1.40 | 1.40 |

Focal length about the respective lens groups

| | |
|---|---|
| f1 | 74.340 |
| f2 | −28.179 |

Converter Lens

Numeral Example 4

Surface data

| Surface No. | r | d | nd | vd |
|---|---|---|---|---|
| 34(Object side-mount surface) | ∞ | −4.077 | | |
| 35 | −222.2349 | 2.459 | 1.92286 | 18.90 |
| 36 | −49.7456 | 5.247 | | |
| 37 | −25.9802 | 1.448 | 1.90366 | 31.32 |
| 38 | 31.0147 | 0.654 | | |
| 39 | 35.7226 | 8.195 | 1.69895 | 30.13 |
| 40 | −21.6871 | 0.150 | | |
| 41 | −30.8000 | 4.593 | 1.90366 | 31.32 |

-continued

| | | | | |
|---|---|---|---|---|
| 42 | 56.5450 | 0.150 | | |
| 43 | 24.0688 | 5.284 | 1.48749 | 70.23 |
| 44 | −105.5726 | −4.439 | | |
| 45(Image side-mount surface) | ∞ | 15.200 | | |
| 46 | ∞ | 4.000 | 1.51633 | 64.14 |
| 47 | ∞ | 0.800 | | |
| Image plane | ∞ | | | |

Various data

| | WE | TE |
|---|---|---|
| Focal length | 57.06 | 205.60 |
| FNO. | 4.03 | 4.03 |
| Angle of view 2ω (°) | 21.85 | 6.07 |
| BF (in air) | 14.200 | 14.200 |
| Full length (in air) | 165.146 | 209.103 |
| Image height | 10.82 | 10.82 |
| Magnification | 1.40 | 1.40 |

Focal length about the respective lens groups

| | |
|---|---|
| f1 | 68.978 |
| f2 | −36.955 |

Converter Lens

Numeral Example 5

Surface data

| Surface No. | r | d | nd | vd |
|---|---|---|---|---|
| 34(Object side-mount surface) | ∞ | −4.396 | | |
| 35 | −106.5559 | 2.347 | 1.69895 | 30.13 |
| 36 | −39.5757 | 4.471 | | |
| 37 | −29.8091 | 1.300 | 1.72916 | 54.68 |
| 38 | 21.9609 | 0.356 | | |
| 39 | 21.6356 | 6.500 | 1.69895 | 30.13 |
| 40 | −23.6427 | 1.300 | 2.00100 | 29.13 |
| 41 | 42.8083 | 0.708 | | |
| 42 | 37.7055 | 5.164 | 1.51633 | 64.14 |
| 43 | −26.8409 | −5.000 | | |
| 44(Image side-mount surface) | ∞ | 15.200 | | |
| 45 | ∞ | 4.000 | 1.51633 | 64.14 |
| 46 | ∞ | 0.800 | | |
| Image plane | ∞ | | | |

Various data

| | WE | TE |
|---|---|---|
| Focal length | 55.95 | 201.58 |
| FNO. | 3.95 | 3.95 |
| Angle of view 2ω (°) | 21.75 | 6.04 |
| BF (in air) | 13.638 | 13.638 |
| Full length (in air) | 164.632 | 208.589 |
| Image height | 10.82 | 10.82 |
| Magnification | 1.37 | 1.37 |

Focal length about the respective lens groups

| | |
|---|---|
| f1 | 88.797 |
| f2 | −42.891 |

FIGS. 7 to 12 are sets of aberration diagrams for Examples 1 to 5 of the master lens MSL and converter lens TCL at the A to D wide-angle end (WE) and E to H telephoto end (TE).

In these aberration diagrams, SA, AS, DT, and CC are the abbreviations for spherical aberrations, astigmatisms, distortions, and chromatic aberrations of magnification, respectively. There are the spherical aberrations SA given at the wavelengths: 587.6 nm (d-line; a solid line), 435.8 nm (g-line; a long broken line), and 656.3 nm (C-line; a short broken line). There are the chromatic aberrations of magnification CC given at the wavelengths: 435.8 nm (g-line; a long broken line) and 656.3 nm (C-line; a short broken line) on a d-line basis. The astigmatisms AS are shown by a solid line for that of the sagittal image surface, and by a broken line for that of the meridional image surface. Note here that FNO is indicative of an F-number.

Set out below are the values of Conditions (1) to (7) in Examples 1 to 5.

| | Example 1 | Example 2 | Example 3 |
|---|---|---|---|
| Condition (1) | −1.136 | −0.811 | −1.503 |
| Condition (2) | −1.086 | −1.708 | −1.715 |
| Condition (3) | 0.190 | 0.092 | 0.179 |
| Condition (4) | 20.88 | 20.88 | 20.88 |
| Condition (5) | 81.54 | 59.84 | 81.54 |
| Condition (6) | 1.629 | 1.507 | 1.443 |
| Condition (7) | 1.312 | 1.213 | 1.321 |

| | Example 4 | Example 5 |
|---|---|---|
| Condition (1) | −0.852 | −1.086 |
| Condition (2) | −2.054 | −2.693 |
| Condition (3) | 0.186 | 0.202 |
| Condition (4) | 18.90 | 30.13 |
| Condition (5) | 70.23 | 64.14 |
| Condition (6) | 1.985 | 1.624 |
| Condition (7) | 1.312 | 1.260 |

To cut off undesired light such as ghosts and flares, a flare stop other than the aperture stop may be located in the inventive master lens MSL. This flare stop may be located in any desired site, for instance, on the object side of the first lens group, between the first and the second lens group, between the second and the third lens group, between the third and the fourth lens group, between the fourth and the fifth lens group, or between the fifth lens group and the image plane.

Flare rays may also be cut off by a frame member or other member. The flare stop may be printed directly, coated, sealed or otherwise bonded to the optical system. The flare stop may be configured in any desired shape such as circular, oval, rectangular or polygonal shape, or may otherwise be formed by a range surrounded by a function curve. In addition to harmful light beams, light beams such as coma flares around the screen may also be cut.

Each lens may be provided with an anti-reflection coating to reduce ghosts and flares. In particular, an antireflection multicoating is preferable because of the ability to effectively reduce ghosts and flares. An infrared cut coating may optionally be applied to each lens surface, cover glass, etc. Optionally, brightness shading around images may be reduced by shifting the micro-lenses of a CCD. For instance, microlens design for the CCD may be altered in association with the angle of incidence of rays at the respective image heights, and image processing may be applied to correct a decrease in light around images.

In general, an antireflection coating is applied to the surface of a lens in contact with air to prevent occurrence of ghosts and flares. At the cementing surface of a cemented lens, on the other hand, the refractive index of an adhesive is ever higher than that of air. For this reason, the cementing surface has often a reflectivity on a par with, or lower than, that of a single-layer coating; so it is less likely to be coated. If the antireflection coating is purposefully applied to the cementing surface too, however, it is then possible to achieve further ghost and flare reductions, thereby making sure good images. Especially in recent years, high-refractive-index vitreous materials have gained popularity, and have often been used on camera optical systems because of having good action on correction of aberrations. However, when such vitreous materials are used for cemented lenses, there is going to be difficult-to-neglect reflection occurring from the cementing surface. In that case, it is particularly effective to apply the antireflection coating to the cementing surface.

How to make effective use of cementing surface coating is set forth typically in JP(A)'s 2-27301, 2001-324676 and 2005-92115 as well as U.S. Pat. No. 7,116,482. According to the teachings of these publications referring to the surface coating of a cemented lens in the first lens group of positive power in a zoom lens in particular, the cemented lens surface in the first lens group in the embodiment of the invention may be coated too.

The coating material used may optionally be selected from materials having relatively high refractive indices such as $Ta_2O_5$, $TiO_2$, $Nb_2O_5$, $ZrO_2$, $HfO_2$, $CeO_2$, $SnO_2$, $In_2O_3$, ZnO and $Y_2O_3$, and materials having relatively low refractive indices such as $MgF_2$, $SiO_2$ and $Al_2O_3$ depending on the refractive index of the lens to be used and the refractive index of the associated adhesive, and the coating thickness may be set in such a way as to meet phase conditions.

It is a matter of course that multicoating may be applied to the cementing surface as is the case with the coating of the air contact surface of a lens. If double coatings or multicoatings are optionally combined with film thicknesses, it is then possible to achieve further reflectivity reductions and gain control of the spectral and angular characteristics of reflectivity, etc. It goes without saying that coating on the same idea may also be effectively applied to any cementing surface in other lens group(s).

Figure 13:
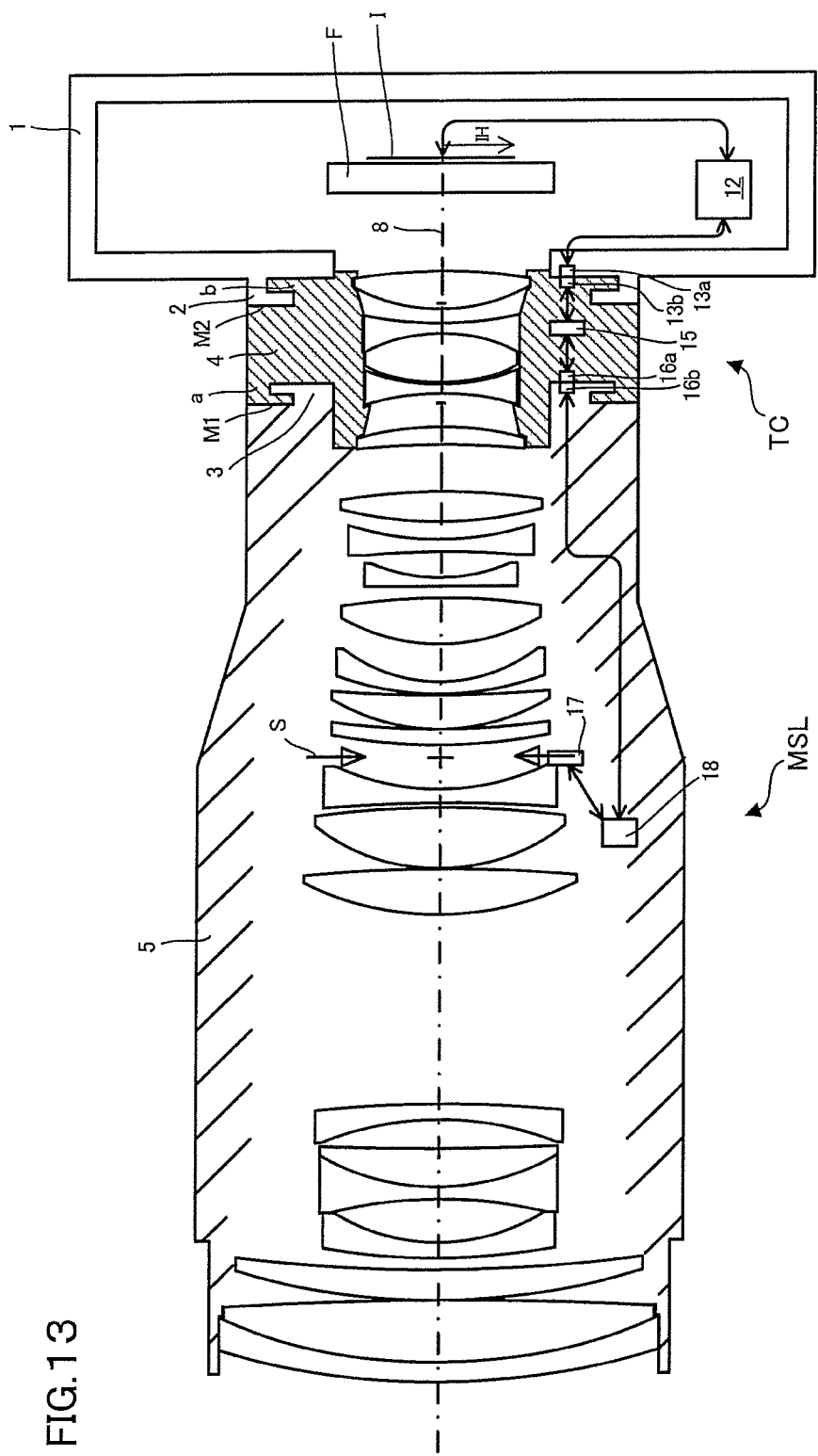
FIG. 13 is a sectional view of one embodiment of the imaging system wherein a converter lens/master lens combination is used for a taking lens.

FIG. 13 is a schematically sectional view of the imaging system in which a combination of the inventive rear converter lens apparatus and master lens apparatus is used for a taking lens. The lens unit is schematically shown, and the aforesaid lens system or the like is used for it.

Referring to FIG. 13, a camera body shown by reference numeral 1 does not include any quick return mirror in the optical path involved. Reference numeral 2 is indicative of a mount in the camera body, where the holder 5 of master lens apparatus MSL or the holder 4 of teleconverter TC is attachable to or detachable from the camera body 1, and reference numeral 3 is a mount in the master lens apparatus MSL, where the holder 5 of master lens apparatus MSL is attachable to or detachable from the camera body 1 or the holder 4 of tele-converter TC.

Further, the holder 4 in the teleconverter TC includes a master lens apparatus-side mount a for attachment of the master lens apparatus MSL and a camera body-side mount b for the attachment or detachment of the camera body, and has an object side-mount surface M1 and an image side-mount surface M2 that, upon attachment, are in engagement with the mount 3 of master lens apparatus MSL and the camera body 1, respectively.

The mount used may be typically of either the screw type, or the bayonet type (used in FIG. 13).

In FIG. 13, P is the imaging plane of an imaging device such as a CCD or C-MOS where a subject image is formed by the master lens apparatus MSL and teleconverter TC. The imaging device is operable to convert the image formed on the imaging plane into electric signals that are then sent to a control circuit 12. Just in front of the imaging plane P there are a cover glass and filters F located.

The imaging system is designed to have the maximum image height IH.

Reference numerals 12, 15, and 18 are indicative of control circuits for regulating or otherwise controlling the aperture stop S, the focal length of master lens apparatus MSL, focusing operation and so on, reference numerals 13a, 13b, 16a, and 16b are indicative of electric contacts for making electric connections between the master lens apparatus MSL, teleconverter TL and camera body 1 for transmission of the aforesaid regulation and control signals, and reference numeral 17 is indicative of a control unit for the aperture stop S. This control unit is electrically connected together with lens control units (not shown) for controlling the respective lens groups to the control circuit 12 of the camera body 1.

Information about the layouts of the respective lens groups in the master lens apparatus MSL may be sent to the camera body 1.

The teleconverter according to the present invention may be used as the optical system (rear teleconverter) of the thus constructed imaging system.

While various embodiments of the invention have been explained, it is to be understood that the present invention is never limited thereto, and embodiments comprising combinations of the essential requirements and limitations are embraced in the category of the invention too.

What is claimed is:

1. A teleconverter, comprising:
    a master lens apparatus-side mount on which a master lens apparatus is mounted,
    a camera body-side mount on which a camera body is mounted, and
    a converter lens unit that has a generally negative refracting power for mounting said master lens apparatus thereon to obtain a lens system having a focal length longer than that of said master lens apparatus, wherein:
    said converter lens unit comprises a first lens group on said master lens apparatus side and a second lens group on said camera body side with an on-axis longest air separation interposed there-between,
    said converter lens unit comprises five lenses: in order from an object side to an image side along an optical path, a first positive lens, a first negative lens, a second positive lens, a second negative lens, and a third positive lens,
    said first lens group has positive refracting power, and
    said second lens group has negative refracting power, with satisfaction of the following condition (3):

$$0.04 < d12/D < 0.3 \quad (3)$$

where d12 is the on-axis longest air separation between said first lens group and said second lens group, and
    D is an on-axis thickness of said converter lens unit.

2. The teleconverter as recited in claim 1, which further satisfies the following Condition (5):

$$50 < nd5 < 100 \quad (5)$$

where nd5 is an Abbe constant of said third positive lens.

3. The teleconverter as recited in claim 2, wherein:
    a total number of lenses in said first lens group is one: said first positive lens, and
    a total number of lenses in said second lens group is four: said first negative lens, said second positive lens, said second negative lens, and said third positive lens.

4. A teleconverter, comprising:
    a master lens apparatus-side mount on which a master lens apparatus is mounted, a camera body-side mount on which a camera body is mounted, and a converter lens unit that has a generally negative refracting power for mounting said master lens apparatus thereon to obtain a lens system having a focal length longer than that of said master lens apparatus, wherein:

said converter lens unit comprises a first lens group on said master lens apparatus side and a second lens group on said camera body side with an on-axis longest air separation interposed there-between, said converter lens unit comprises five lenses: in order from an object side to an image side along an optical path, a first positive lens, a first negative lens, a second positive lens, a second negative lens, and a third positive lens, said first lens group has positive refracting power, and
said second lens group has negative refracting power, with satisfaction of the following condition (5):

$$50 < nd5 < 100 \qquad (5)$$

where nd5 is an Abbe constant of said third positive lens.

5. The teleconverter as recited in claim 4, wherein:
a total number of lenses in said first lens group is one: said first positive lens, and
a total number of lenses in said second lens group is four: said first negative lens, said second positive lens, said second negative lens, and said third positive lens.

6. A teleconverter, comprising:
a master lens apparatus-side mount on which a master lens apparatus is mounted,
a camera body-side mount on which a camera body is mounted, and
a converter lens unit that has a generally negative refracting power for mounting said master lens apparatus thereon to obtain a lens system having a focal length longer than that of said master lens apparatus, wherein:
said converter lens unit comprises a first lens group on said master lens apparatus side and a second lens group on said camera body side with an on-axis longest air separation interposed there-between,
said first lens group has positive refracting power,
said second lens group has negative refracting power,
said converter lens unit comprises five lenses: in order along an optical path, a first positive lens, a first negative lens, a second positive lens, a second negative lens, and a third positive lens,
a total number of lenses in said first lens group is one: said first positive lens, and
a total number of lenses in said second lens group is four: said first negative lens, said second positive lens, said second negative lens, and said third positive lens.

7. An imaging system, characterized by comprising:
a master lens apparatus,
a camera body, and
a teleconverter capable of being mounted between said master lens apparatus and said camera body, wherein:
said teleconverter comprises:
  a master lens apparatus-side mount on which said master lens apparatus is mounted,
  a camera body-side mount on which said camera body is mounted, and
  a converter lens unit that has a generally negative refracting power for mounting said master lens apparatus thereon to obtain a lens system having a focal length longer than that of said master lens apparatus, wherein:

said converter lens unit comprises a first lens group on said master lens apparatus side and a second lens group on said camera body side with an on-axis longest air separation interposed there-between, said first lens group has positive refracting power, and
said second lens group has negative refracting power, with satisfaction of the following condition (3):

$$0.04 < d12/D < 0.3 \qquad (3)$$

where d12 is the on-axis longest air separation between said first lens group and said second lens group, and D is an on-axis thickness of said converter lens unit, and said camera body includes an imaging device that is located in a position of an image formed by a combined optical system of said master lens apparatus and said teleconverter, and operable to convert the image formed by said combined optical system into electric signals.

8. An imaging system, characterized by comprising:
a master lens apparatus,
a camera body, and
a teleconverter capable of being mounted between said master lens apparatus and said camera body, wherein:
said teleconverter comprises:
a master lens apparatus-side mount on which said master lens apparatus is mounted,
a camera body-side mount on which said camera body is mounted, and
a converter lens unit that has a generally negative refracting power for mounting said master lens apparatus thereon to obtain a lens system having a focal length longer than that of said master lens apparatus, wherein:
said converter lens unit comprises a first lens group on said master lens apparatus side and a second lens group on said camera body side with an on-axis longest air separation interposed there-between,
said converter lens unit comprises five lenses: in order from an object side to an image side along an optical path, a first positive lens, a first negative lens, a second positive lens, a second negative lens, and a third positive lens,
said first lens group has positive refracting power, and
said second lens group has negative refracting power, with satisfaction of the following condition (5):

$$50 < nd5 < 100 \qquad (5)$$

where nd5 is an Abbe constant of said third positive lens, and said camera body includes an imaging device that is located in a position of an image formed by a combined optical system of said master lens apparatus and said teleconverter, and operable to convert the image formed by said combined optical system into electric signals.

9. An imaging system, characterized by comprising:
a master lens apparatus,
a camera body, and
a teleconverter capable of being mounted between said master lens apparatus and said camera body, wherein:
said teleconverter comprises:
  a master lens apparatus-side mount on which said master lens apparatus is mounted,
  a camera body-side mount on which said camera body is mounted, and
  a converter lens unit that has a generally negative refracting power for mounting said master lens apparatus thereon to obtain a lens system having a focal length longer than that of said master lens apparatus, wherein:

said converter lens unit comprises a first lens group on said master lens apparatus side and a second lens group on said camera body side with an on-axis longest air separation interposed there-between, said first lens group has positive refracting power, said second lens group has negative refracting power, said converter lens unit comprises five lenses: in order along an optical path, a first positive lens, a first negative lens, a second positive lens, a second negative lens, and a third positive lens, a total number of lenses in said first lens group is one: said first positive lens, and a total number of lenses in said second lens group is four: said first negative lens, said second positive lens, said second negative lens, and said third positive lens, and said camera body includes an imaging device that is located in a position of an image formed by a combined optical system of said master lens apparatus and said teleconverter, and operable to convert the image formed by said combined optical system into electric signals.

* * * * *